(12) United States Patent
Moustafa et al.

(10) Patent No.: US 11,589,657 B2
(45) Date of Patent: Feb. 28, 2023

(54) WRISTBANDS WITH MAGNETIC COUPLING

(71) Applicant: Apple Inc., Cupertino, CA (US)

(72) Inventors: Zaki Moustafa, Palo Alto, CA (US); Hsiang Hung Chen, New Taipei (TW); Stephen E. Dey, San Francisco, CA (US); Qigen Ji, Fairfield, CA (US); Hao Zhu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/322,661

(22) Filed: May 17, 2021

(65) Prior Publication Data

US 2021/0267325 A1 Sep. 2, 2021

Related U.S. Application Data

(63) Continuation of application No. 16/132,191, filed on Sep. 14, 2018, now Pat. No. 11,033,083.

(60) Provisional application No. 62/559,444, filed on Sep. 15, 2017.

(51) Int. Cl.
*A44C 5/20* (2006.01)
*A44C 5/16* (2006.01)
*H01F 7/02* (2006.01)
*G06F 1/16* (2006.01)

(52) U.S. Cl.
CPC .............. *A44C 5/2071* (2013.01); *A44C 5/16* (2013.01); *G06F 1/163* (2013.01); *H01F 7/0215* (2013.01); *H01F 7/0263* (2013.01); *A44D 2203/00* (2013.01)

(58) Field of Classification Search
CPC ......... A44C 5/2071; A44C 5/16; G06F 1/163; H01F 7/0215; H01F 7/0263; A44D 2203/00
See application file for complete search history.

(56) References Cited

U.S. PATENT DOCUMENTS

| | | | |
|---|---|---|---|
| 6,129,659 A | 10/2000 | Wilk | |
| 6,348,033 B1* | 2/2002 | Catlett | A61N 2/00 600/15 |
| 6,412,116 B1 | 7/2002 | Clark | |
| 10,117,504 B2* | 11/2018 | Bataillou | A44C 5/2071 |
| 2010/0004632 A1 | 1/2010 | Wu | |
| 2011/0252609 A1 | 10/2011 | Rothbaum | |
| 2011/0253571 A1 | 10/2011 | Rothbaum | |
| 2013/0326790 A1* | 12/2013 | Cauwels | A61B 5/02233 2/170 |
| 2015/0088195 A1 | 3/2015 | Moustafa | |

(Continued)

*Primary Examiner* — David M Upchurch
(74) *Attorney, Agent, or Firm* — BakerHostetler

(57) ABSTRACT

A wristband can comfortably secure an electronic device, such as a wristwatch or fitness/health tracking device, to a wrist of a user. The wristband can include a number of magnets that allow the wristband to be magnetically coupled to itself when folded over or when separate band portions are overlapping. The magnets can include a polymer mixed with a magnetic material to provide magnetic properties and flexibility. The magnets can be joined together by a continuous support structure that extends through opposing pairs of the magnets. The support structure can provide substantial and ability as well as tensile strength. The magnets and the support structure can be surrounded by a flexible cover to protect the components within.

19 Claims, 13 Drawing Sheets

(56) References Cited

U.S. PATENT DOCUMENTS

| | | |
|---|---|---|
| 2015/0099941 A1 | 4/2015 | Tran |
| 2015/0364237 A1 | 12/2015 | Mayfield |
| 2016/0015146 A1 | 1/2016 | Accarrino |
| 2016/0037841 A1 | 2/2016 | Dey |
| 2016/0037896 A1* | 2/2016 | Kosoglow ................. A45F 5/00 224/267 |
| 2016/0058375 A1 | 3/2016 | Rothkopf |
| 2016/0307680 A1 | 10/2016 | Provencher |
| 2017/0092403 A1 | 3/2017 | Wooldridge |
| 2018/0350491 A1 | 12/2018 | Bharadwaj |

* cited by examiner

WRISTBANDS WITH MAGNETIC COUPLING

CROSS-REFERENCE TO RELATED APPLICATIONS

This application is a continuation of U.S. application Ser. No. 16/132,191, filed Sep. 14, 2018, which claims the benefit of U.S. Provisional Application No. 62/559,444, entitled "WRISTBANDS WITH MAGNETIC COUPLING," filed Sep. 15, 2017, the entirety of each of which is incorporated herein by reference.

TECHNICAL FIELD

The present description relates generally to securement of wearable devices, and, more particularly, to wristbands with magnetic coupling.

BACKGROUND

Some electronic devices may be removably attached to a user. For example, a wristwatch or fitness/health tracking device can be attached to a user's wrist by joining free ends of a wristband together. In many cases, wristbands may have limited fit adjustment increments available. For example, some bands have an incrementally user-adjustable size (e.g., a buckling clasp, pin and eyelet, etc.) whereas other bands have a substantially fixed size, adjustable only with specialized tools and/or expertise (e.g., folding clasp, deployment clasp, snap-fit clasp, etc.). Other bands may be elastic expansion-type bands that stretch to fit around a user's wrist, flexible bands including buckles, or metal bands including metal clasps. The degree of comfort and securement of the electronic device can depend on the function and arrangement of the wristband. However, conventional bands can have negative aspects and can undesirably fail prior to the failure of the wearable electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
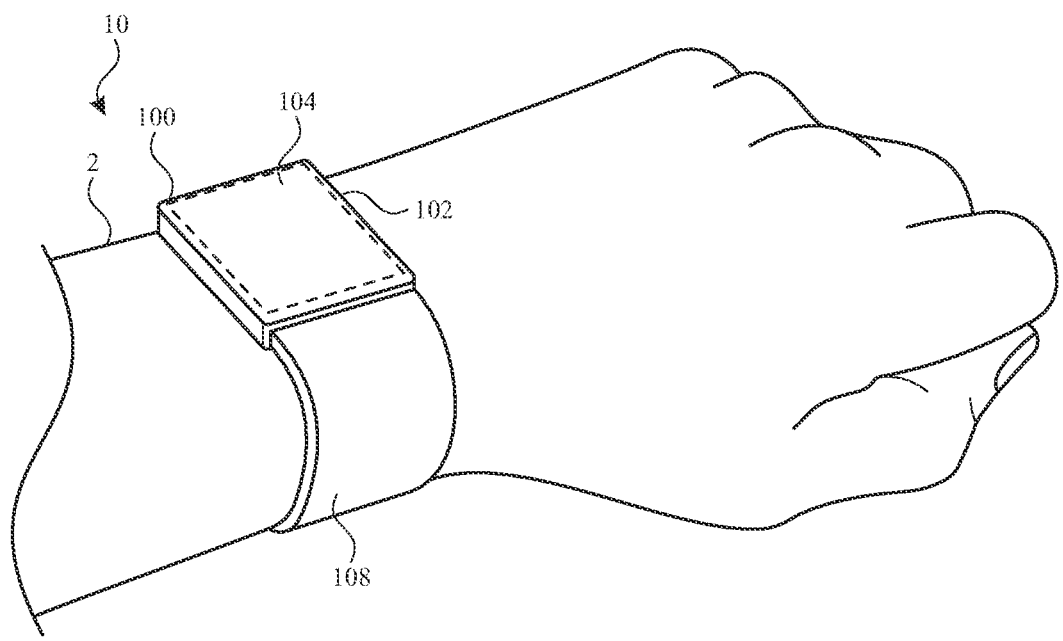
FIG. 1 shows a perspective view of a watch on a wrist of a user.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

An electronic device, such as a wristwatch or fitness/health tracking device, can be attached to a user's wrist by a wristband. Conventional elastic bands can lose elastic properties over time and can become too big for a user's wrist. Other materials forming the flexible bands can tear or deteriorate over time due to forces applied at the hole of the flexible band by a tongue of a buckle. Metal bands including a metal clasp can include a plurality of components all coupled together, which can fail, become uncoupled, or otherwise malfunction over time. When a conventional wearable band fails and/or is incapable of securely attaching the electronic device to a user's wrist, the band needs to be replaced and/or the wearable electronic device can be susceptible to damage.

It can be desirable to maintain a secure attachment to the wrist so that the electronic device does not shift excessively or slip off of the user. Securement of the electronic device against the user can also be important for the function of electronic magnets, such as biometric sensors. Additionally, it can be desirable to maximize the comfort of the user while wearing the electronic device. Often, a secure attachment can apply an undesirable amount of force on the wrist of the user. In many cases, conventional wristbands may catch, pinch, or pull a user's hair or skin during use if the band is overly tight. In other cases, wristbands may slide along a user's wrist, turn about a user's wrist, or may be otherwise uncomfortable or bothersome to a user if the band is overly loose. These problems can be exacerbated during periods of heightened activity, such as while running or playing sports.

Furthermore, adjusting the size or fit of conventional wristbands often requires multiple steps, specialized tools, and/or technical expertise. Sizing options available to a user may be insufficient to obtain a proper fit. The fit may be different and/or may be perceived to be different given certain environmental (e.g. temperature, humidity) or biological conditions (e.g., sweat, inflammation). As a result, users of conventional wristwatches and/or fitness/health tracking devices may select a tolerable (although not optimally comfortable) fit, reserving tight bands for fitness/health tracking devices and loose bands for conventional wristwatches. However, some wearable electronic devices may be multi-purpose devices, providing both fitness/health tracking and timekeeping functionality. Accordingly, a user may prefer the fit of a band to vary with use. For example, a user may prefer a looser fit in a timekeeping mode and a tighter fit in a fitness/health tracking mode. Accordingly, there is a present need for systems and methods for dynamic adjustment of the fit of wearable electronic devices.

Additionally, it may be desirable to provide a wristband that provided magnetic coupling to secure and adjust the wristband with ease. For enhanced comfort, it can be desirable to provide magnetic parts with significant flexibility for greater comfort when worn by the user.

Embodiments of the present disclosure provide magnetic attachment mechanisms to provide secure attachment to a user and also provide enhanced comfort. For example, magnetic coupling can be achieved with flexible magnets that are more comfortable than rigid magnets, while still providing secure attachment to the user and convenient adjustment. Embodiments of the present disclosure provide ease of adjustment by a user as well as secure attachment to avoid inadvertent release under external forces.

According to some embodiments, a wristband can include flexible magnets, wherein each of the flexible magnets comprises a mixture of a polymer and a ferromagnetic material, and a flexible cover surrounding the flexible magnets. According to some embodiments, a wristband can include multiple opposing pairs of magnets, a support structure extending between each of the opposing pairs of the magnets, and a cover surrounding the magnets. According to some embodiments, a wristband can include a support structure, first magnets of a first side of the support structure, and second magnets on a second side of the support structure, wherein opposing pairs of the first magnets and second magnets are symmetric relative to each other across the support structure.

These and other embodiments are discussed below with reference to FIGS. 1-26. However, those skilled in the art will readily appreciate that the detailed description given herein with respect to these Figures is for explanatory purposes only and should not be construed as limiting.

Figure 2:
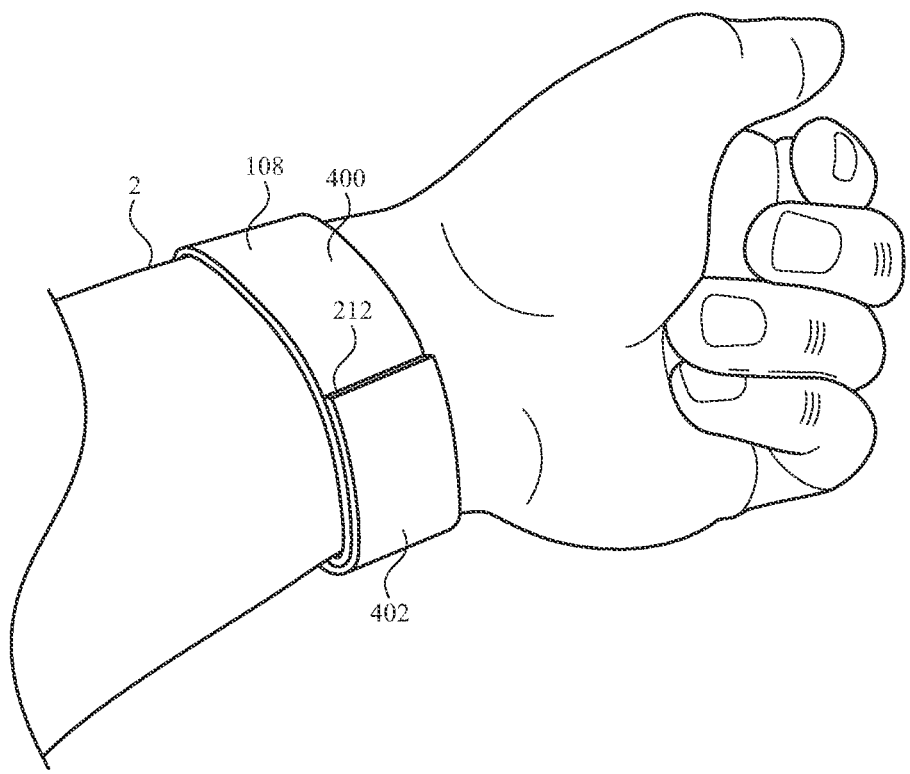
FIG. 2 shows another perspective view of the watch of FIG. 1 on the wrist of the user.

Referring to FIGS. 1 and 2, an example of a wearable electronic device, such as a watch 10, is shown. While FIG. 1 illustrates the device as the watch 10, it will be recognized that features described herein with respect to the watch 10 can be applied to a variety of other devices, such as other wearable devices, other electronic devices, portable computing devices, fitness/health tracking devices, cell phones, smart phones, tablet computers, laptop computers, cameras, timekeeping devices, computerized glasses, and other wearable devices navigation devices, displays, sports devices, accessory devices, health-monitoring devices, medical devices, wristbands, bracelets, jewelry, and/or the like.

As shown in FIG. 1, the watch 10 includes an electronic device 100 (e.g., a watch body of a watch) that is worn on a wrist 2 with a wristband 108. The electronic device 100 can be portable and also attached to other body parts of the user or to other devices, structures, or objects. The wristband 108 can be flexible and encircle at least a portion of the wrist 2 of a user. By securing the electronic device 100 to the person of the user, the wristband 108 provides security and convenience. In some embodiments, the electronic device 100 includes a display 104 and a housing 102 for containing magnets. As shown in FIG. 2, the wristband 108 extends to an opposite side of the wrist 2 from the electronic device 100. The wristband 108 includes a first section 400 and a second section 402 that overlap and magnetically couple to each other.

Figure 3:
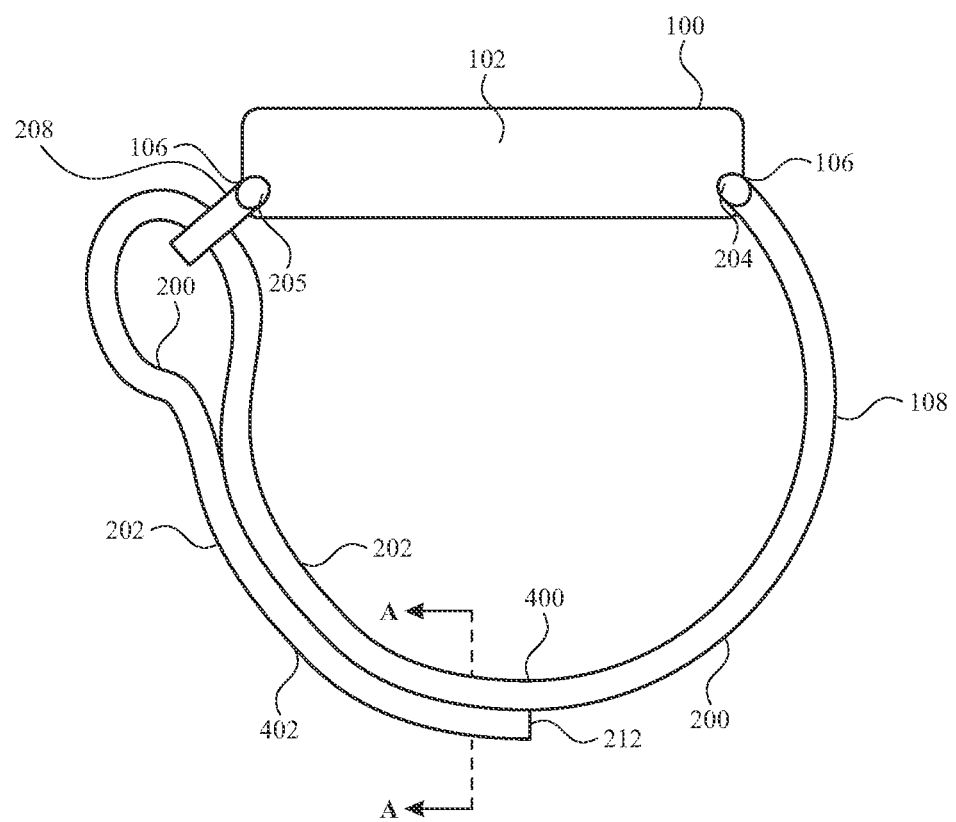
FIG. 3 shows a side view of a watch with a wristband.

Referring now to FIG. 3, the wristband 108 is adjustable to fit securely and comfortably onto the wrist 2 by selecting an extent of overlap between the first section 400 and the second section 402. For example, the diameter of the wristband 108 is adjustable to be appropriate for a secure and comfortable fit on the wrist 2. The wristband 108 removably attaches to a portion (e.g., a channel 106) of the housing 102 of the electronic device 100 with a first connector 204. The wristband 108 removably attaches to another portion of the housing 102 of the electronic device 100 with a retaining ring 208. Accordingly, the wristband is removable from the electronic device 100, thereby permitting a user to switch wristbands as necessary or desired. A portion of the wristband 108 passes through a hole of the retaining ring 208, such that the length of the first section 400 and the length of the second section 402 are defined on either side of the retaining ring 208.

A contact surface 202 of the wristband 108 is positionable to contact the wrist of the user. Along the first section 400, the contact surface 202 faces inwardly toward the wrist. Along the second section 402, the contact surface 202 continues as an outwardly facing surface. An engagement surface 200 of the wristband 108 is positionable to contact itself when the wristband 108 is folded onto itself. Along the first section 400, the engagement surface 200 faces outwardly away from the wrist. Along the second section 402, the engagement surface 200 faces inwardly toward the first section 400 and opposite the portion of the engagement surface 200 that extends along the first section 400. Magnets are provided near at least the engagement surface 200 to magnetically couple the first section 400 to the second section 402, as described further herein.

Figure 4:
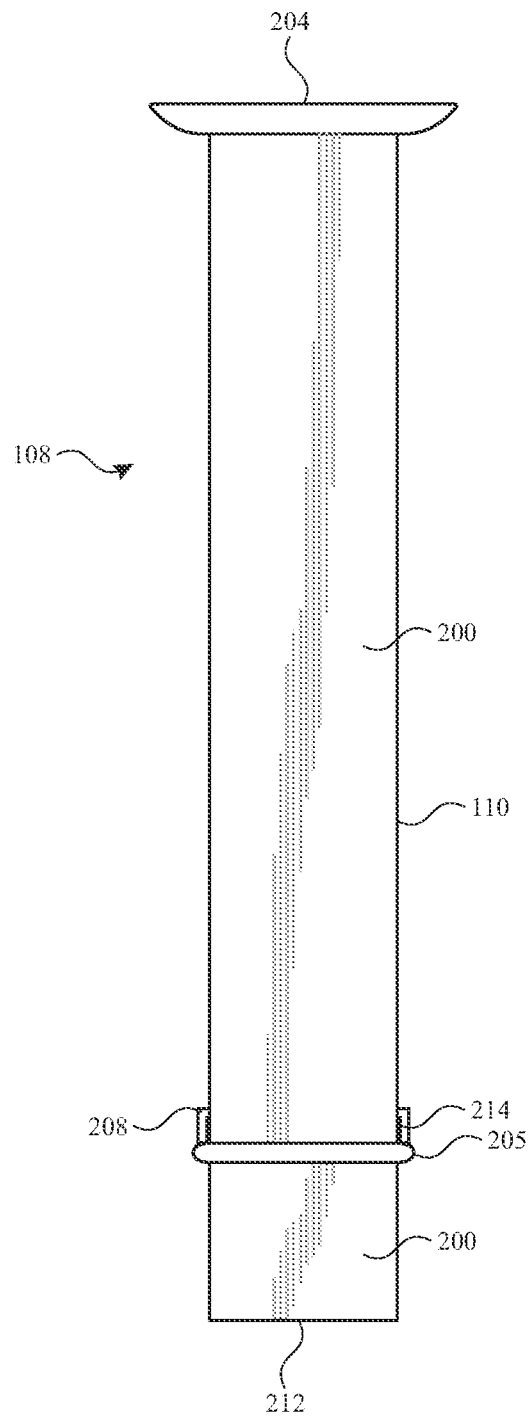
FIG. 4 shows a top view of a wristband.

Referring now to FIG. 4, the first connector 204 and a free end 212 are located at or near ends of the wristband 108. The retaining ring 208 is slidably connected to a strap portion 110 of the wristband 108 and provides a connection to the housing of the electronic device. The retaining ring 208 can have a second connector 205, similar to the first connector 204 of the strap portion 110, and an opening 214 through which the strap portion 110 can extend. At least a portion of the free end 212 has at least one cross-sectional dimension that is larger than at least one cross-sectional dimension of the opening 214. For example, a portion of the free end 212 can have a lateral cross-sectional dimension, transverse to a longitudinal axis of the wristband 108, that is larger than a lateral cross-sectional dimension of the opening 214. It will be recognized that such a free end 212 is not required, but can optionally pass through the opening 214 to remove the strap portion 110 from the retaining ring 208. It will be further recognized that the retaining ring 208 can have a length between the second connector 205 and the opening 214 that is greater than that depicted in FIG. 4.

Figure 5:
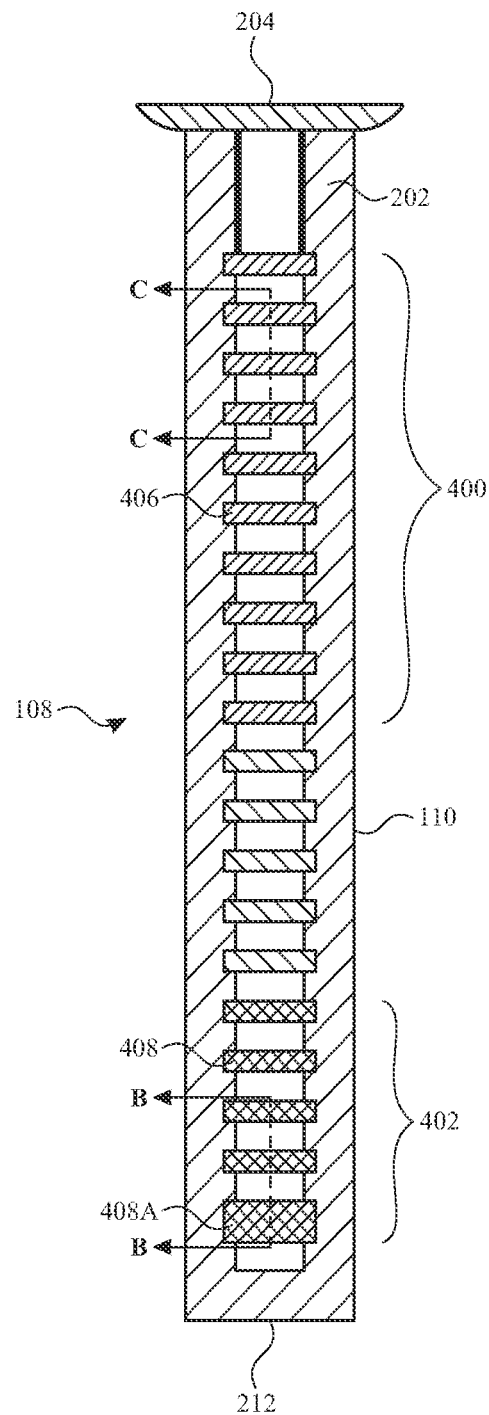
FIG. 5 shows a sectional view of the wristband of FIG. 4.

FIG. 5 shows a cross-sectional view of the strap portion 110 of the wristband 108. The wristband 108 may include a plurality of first magnets 406 and second magnets 408 distributed along a longitudinal length of the wristband 108. More specifically, as shown in FIG. 5, the wristband 108 may include a first group of first magnets 406 along a first section 400 positioned adjacent to the first connector 204, and a second group of second magnets 408 along a second section 402 positioned adjacent to the free end 212 and opposite the first group of first magnets 406. The first magnets 406 and second magnets 408 can be evenly distributed along the longitudinal length of the wristband 108. Additional magnets or other inserts can be provided, for example, between the first group of first magnets 406 and the second group of second magnets 408.

The first group of first magnets 406 and the second group of second magnets 408 can be formed from a material that may include magnetic properties (e.g., magnetic field, magnetic attraction, and so on). In non-limiting examples, each of the first magnets 406 within the first section 400 can produce a first magnetic field, and each of the second magnets 408 within the second section 402 can produce a second magnetic field. The second magnetic field of the one or more second magnets 408 may be distinct (for example, larger or oriented differently) than the first magnetic field of the one or more first magnets 406. As discussed further herein, one or more of the second magnets 408 can be magnetically attracted and/or coupled to one or more of the first magnets 406 when the wristband 108 is folded onto itself for coupling the wristband 108 and an electronic device to a user.

As used herein, "magnet" can include a magnet of a hard magnetic material and/or a magnet of a soft magnetic material. Hard magnetic materials include materials that retain their magnetism even after the removal of an applied magnetic field. Magnets that include hard magnetic material can form permanent magnets. Hard magnetic materials include neodymium (NdFeB), ferrite, AlNiCo, iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon (FeSi), steel, stainless steel, iron-aluminum-silicon, nickel-iron, ferrites, and combinations or alloys thereof. It will be recognized that "hard magnetic" and "soft magnetic" does not necessarily relate to the rigidity of the materials.

One or more of the magnets of the wristband 108 can be flexible. To provide the desired flexibility, each of the flexible magnets can include a mixture of a polymer and a magnetic (e.g., hard magnetic or soft magnetic) material. The polymer can include, for example, an elastomer, rubber, silicone, a flouroelastomer, FKM (containing vinylidene fluoride), neoprene, and/or combinations thereof. The polymer can be mixed with a powder or other components of a magnetic material to form a flexible magnet.

The first magnets 406 and/or the second magnets 408 can be single magnets or multi-pole magnetic structures. For example, the first magnets 406 and/or the second magnets 408 can each be composed of a single monolithic magnet. By further example, the first magnets 406 and/or the second magnets 408 can each be composed of multiple individual magnets. Where the first magnets 406 and/or the second magnets 408 are composed of multiple individual magnets, respective magnets can be coupled to adjacent magnets via magnetic attraction, adhesive, soldering, cementing, welding, sintering, or the like. In some cases, the individual magnets that constitute the first magnets 406 and/or the second magnets 408 are not coupled to one another, but are merely in proximity to one another in an assembled wristband 108. Examples of multi-pole magnet structures and embodiments of the wristband 108 that employ multi-pole magnet structures are discussed further herein.

As shown in FIG. 5, the number of first magnets 406 in the first section 400 can be the same as or different than the number of second magnets 408 in the second section 402. For example, the one or more first magnets 406 in the first section 400 can be positioned along the majority of a length of wristband 108. By further example, as shown in FIG. 5, the one or more first magnets 406 in the first section 400 can be positioned along approximately half of the length of the wristband 108. The one or more second magnets 408 in the second section 402 can span or be positioned over the remainder of the length of the wristband 108. It will be recognized that the number of first magnets 406 and second magnets 408 shown in FIG. 5 is merely exemplary and that other numbers and distributions are contemplated.

As shown in FIG. 5, the one or more second magnets 408 in the second section 402 can include an enlarged second magnet 408A positioned directly adjacent to the free end 212 of the wristband 108. The enlarged second magnet 408A can be substantially larger than the remaining second magnets 408 in the second section 402. Additionally, the enlarged second magnet 408A can be substantially larger than the remaining one or more first magnets 406 in the first section 400. The enlarged second magnet 408A can be larger than the remaining second magnets 408 in the second section 402 to produce a stronger magnetic field or flux, and to ultimately ensure that the portion of the wristband 108 including enlarged second magnet 408A is magnetically coupled to a distinct first magnet 406, as discussed further herein. The enlarged second magnet 408A can also be sized to prevent the strap portion from being removed from the retaining ring 208.

Figure 6:
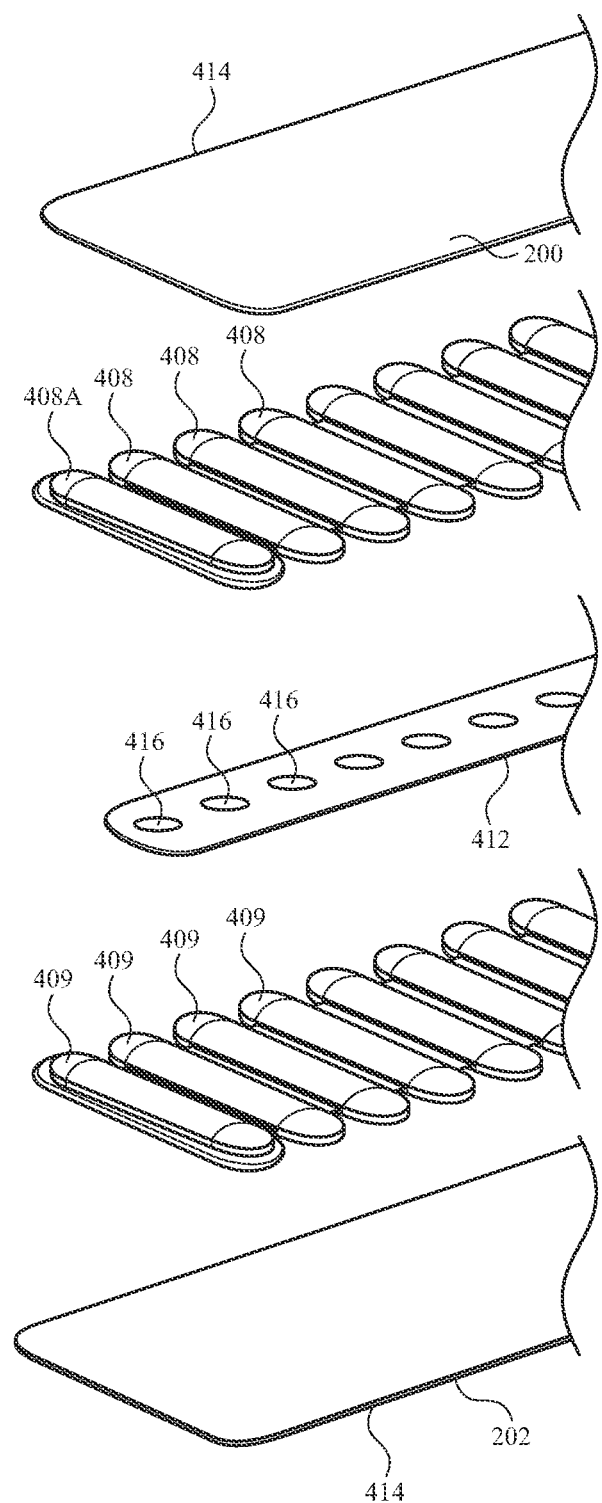
FIG. 6 shows a perspective exploded view of a portion of the wristband of FIG. 4.

Referring now to FIG. 6, an assembly for a wristband can include multiple layers that support multiple magnets. As shown in FIG. 6, a support structure 412 can be provided between opposing pairs of magnets (e.g., magnets 408 and 409). The support structure 412 can join the magnets together and maintain the magnets in a desired arrangement along a length of the wristband. For example, the support structure 412 can be generally inextensible along a longitudinal length thereof, thereby providing high tensile strength along a long axis. The support structure 412 can also provide high bendability to permit the wristband to fold onto itself. The support structure 412 can form a ribbon that is wide in one dimension transverse to its length, but thin in another dimension that is transverse to its length. The support structure 412 can have a length sufficient to extend between multiple pairs of magnets. The support structure 412 can be formed of multiple woven fibers. For example, the support structure 412 can include fabric, polymers, synthetic fibers, polyester, liquid crystal polymer, fiber glass, carbon fiber, and/or combinations thereof.

As shown in FIG. 6, the support structure 412 can include one or more holes 416. One or more of the holes 416 can provide a location for engagement by a tool. For example, the holes 416 can be engaged by a tool to hold the support structure 412 in place during assembly. One or more of the holes 416 can provide a passage through a thickness of the support structure (e.g., from a first side and a second side of the support structure 412). For example, the holes 416 can provide a conduit for connecting inner second magnets 408 to outer second magnets 409. Thereby, the inner second magnets 408 and the outer second magnets 409 can be joined together through the support structure 412. The support structure 412 can also be provided with a coating to prevent fraying and/or facilitate adhesion to other components. The coating can include, for example, polyurethane, silicone, another elastomer, and/or combinations thereof.

As further shown in FIG. 6, the inner second magnets 408 and the outer second magnets 409 can be positioned as pairs on opposing sides of the support structure 412. The magnets can be formed, for example, by molding onto the support structure 412. The magnets can be preformed or formed by providing the mixtures used for the magnets to the support structure 412. The mixtures can be molded, cured, and/or cross-linked against the support structure 412. The opposing pairs of magnets can also be molded, cured, and/or cross-linked to each other through the holes 416 of the support structure 412 and/or outside the width of the support structure 412. Each of the magnets can include at least one flat surface that faces both the support structure 412 and an opposing magnet. The opposing magnets can be positioned so that the support structure 412 extends along a central line or plane of the wristband. For example, opposing pairs of magnets can be symmetric relative to each other across the support structure 412.

As further shown in FIG. 6, the support structure 412, the inner second magnets 408, and the outer second magnets 409 can be surrounded by a cover 414. The cover 414 can be formed by over-molding with respect to the components therein. The cover 414 can define both the engagement surface 200 and the contact surface 202 of the wristband. The separate sides of the cover 414 can be formed in one step or separate steps. For example, a first one of the sides can be formed to ensure alignment with a mold. Subsequently, the remaining side can be formed in a separate molding step. The cover 414 can be joined directly to at least a portion of the support structure 412 and the magnets. The cover 414 can include a flexible material, such as an elastomer, rubber, silicone, a flouroelastomer, and/or combinations thereof.

Figure 7:
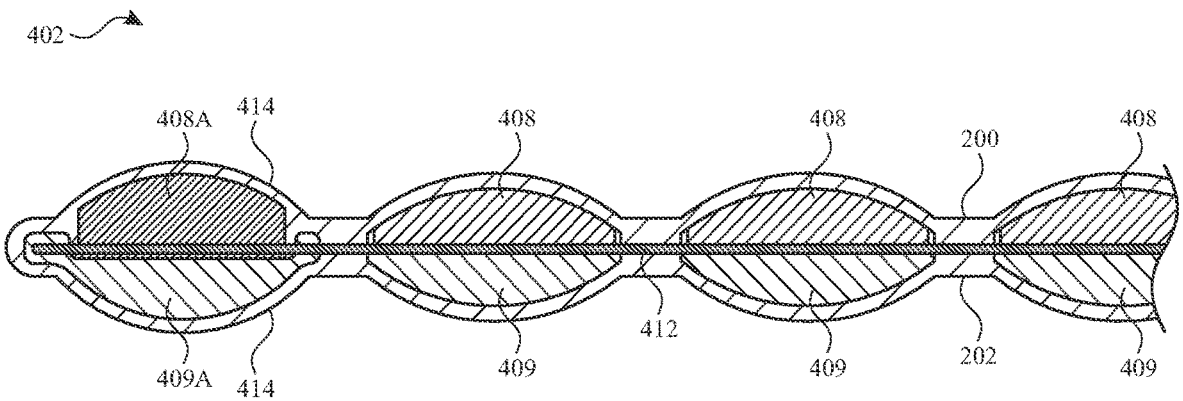
FIG. 7 shows a sectional view of an outer portion of the wristband of FIG. 5 along line B-B.
Figure 8:
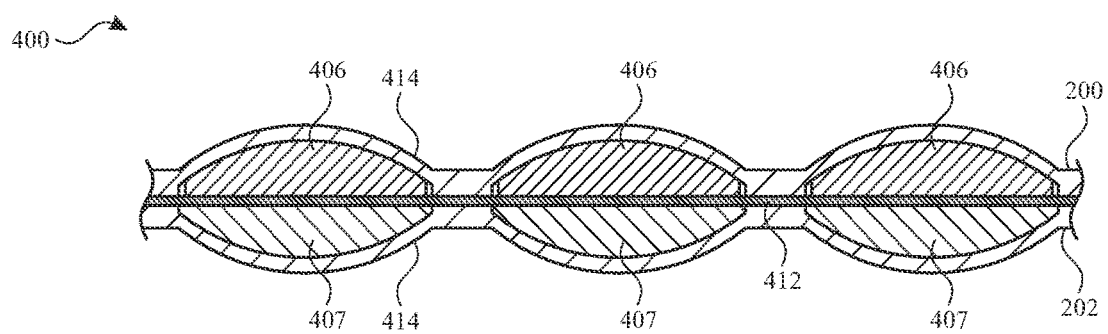
FIG. 8 shows a sectional view of an outer portion of the wristband of FIG. 5 along line C-C.

Referring now to FIGS. 7 and 8, cross-sectional side views are shown for distinct portions of the wristband. Specifically, FIG. 7 shows a cross-sectional side view of the second section 402 taken along line 7-7 of FIG. 5, and depicts inner second magnets 408 and outer second magnets 409. Additionally, FIG. 8 shows a cross-sectional side view of the first section 400 taken along line 8-8 of FIG. 5, and depicts inner first magnets 406 and outer first magnets 407. It is understood that similarly named components or similarly numbered components can function in a substantially similar fashion, can include similar materials and/or can include similar interactions with other components. Redundant explanation of these components has been omitted for clarity.

As shown in FIGS. 7 and 8, at least some of the magnets can form shunts. For example, the outer first magnets 407 and the outer second magnets 409 can each include a soft magnetic material and be positioned opposite a permanent magnet, such as one of the inner first magnets 406 and the inner second magnets 408. The magnets forming shunts can be positioned so that, when the wristband is folded onto itself, the shunts face outwardly and the permanent magnets face each other for magnetic coupling. The shunts can substantially block, redirect, or minimize a magnetic flux in a region covered by the shunt. It will be recognized that the outer first magnets 407 and the outer second magnets 409 can also be permanent magnets, for example, with magnetic field orientations that are the same or parallel to that of an opposing magnet.

The outer first magnets 407 and/or the outer second magnets 409 can include soft magnetic material that is different than a permanent magnet material of the inner first magnets 406 and/or the inner second magnets 408. For example, the outer first magnets 407 and/or the outer second magnets 409 can include a first magnetic material (e.g., neodymium) and the inner first magnets 406 and/or the inner second magnets 408 can include a second magnetic material (e.g., iron-cobalt). Additionally or alternatively, the outer first magnets 407, the outer second magnets 409, the inner first magnets 406, and/or the inner second magnets 408 can include the same magnetic material and/or the same polymer.

The magnetic materials can include constituent parts that are different from each other to facilitate the functions of permanent magnets and/or shunts. For example, isotropic and/or anisotropic particles can be used to facilitate functions of the magnets and/or shunts. The characteristic "anisotropic" or "isotropic" indicates if a magnet or magnetic particle has a preferred magnetization direction. An isotropic particle has no preferred magnetization direction, and thus can be magnetized in any direction. An anisotropic particle has a preferred magnetization direction, and thus can be magnetized in only a specified direction.

The inner first magnets 406 and/or the inner second magnets 408 can include anisotropic particles of a hard magnetic material to facilitate orientation of the particles within a polymer during a formation stage. The anisotropic particles can maintain retain their magnetism based on their orientation and the applied magnetic field even after the removal of the applied magnetic field. By further example, the outer first magnets 407 and/or the outer second magnets 409 can include isotropic particles of a soft magnetic material to facilitate temporary magnetic responsiveness of the soft magnetic material to a variety of applied magnetic fields.

Figure 9:
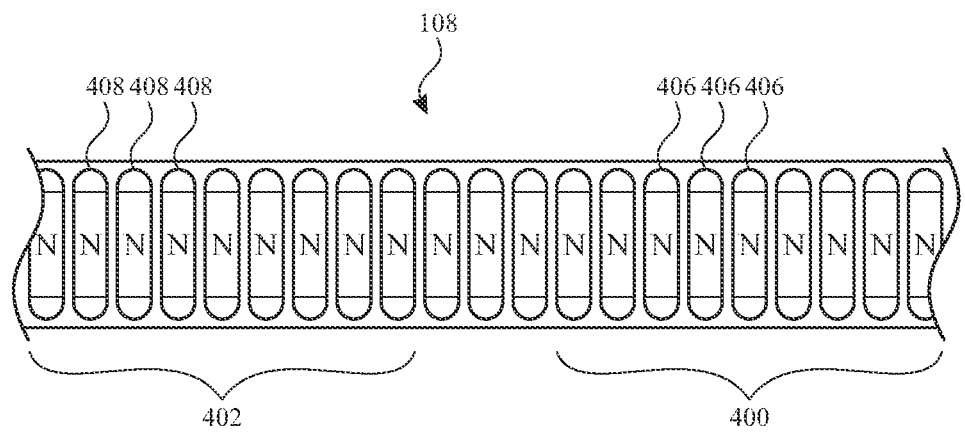
FIG. 9 shows a schematic diagram for a wristband.
Figure 10:
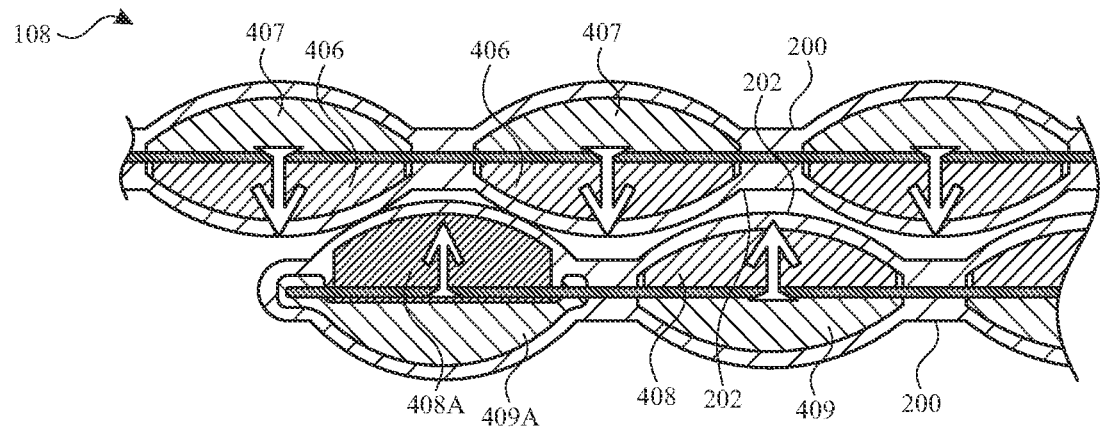
FIG. 10 shows a sectional view of overlapping portions of the wristband of FIG. 9 in a first configuration.
Figure 11:
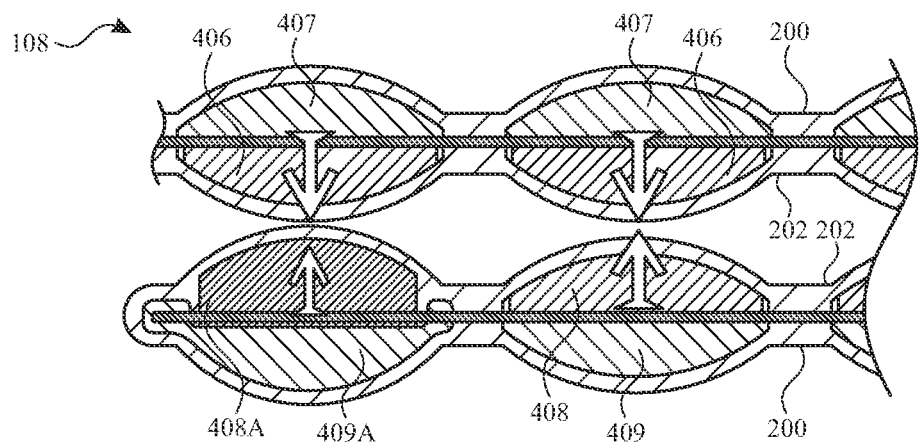
FIG. 11 shows a sectional view of overlapping portions of the wristband of FIG. 9 in a second configuration.

Referring now to FIGS. 9-11, the magnets can have the same magnetic field orientations at different sections of the wristband. For example, as shown in FIG. 9, first magnets 406 along a first section 400 of the wristband 108 can have a magnetic field orientations that is the same or parallel to the magnetic field orientations of second magnets 408 along a second section 402 of the wristband 108.

As shown in FIG. 10, when the wristband is folded onto itself, some of the first magnets 406 and second magnets 408 can be nested within each other while the contact surface 202 faces itself. In this arrangement, the first magnets 406 and second magnets 408 can be magnetically coupled to each other. Where the wristband 108 is curved while folded onto itself, different magnetic alignments may be provided. For example, other regions of the same wristband 108 may be arranged as shown in FIG. 11. While the magnetic coupling may be weaker in these regions, the variously arranged magnets provide adequate magnetic coupling.

Figure 12:
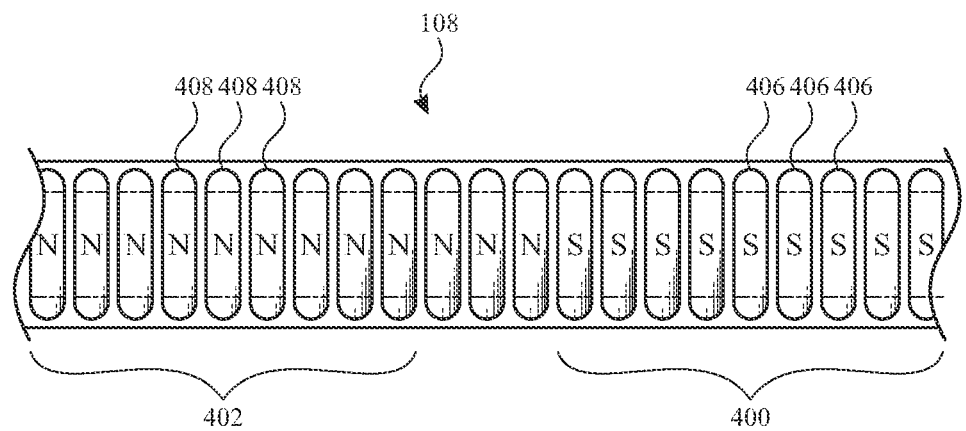
FIG. 12 shows a schematic diagram for a wristband.
Figure 13:
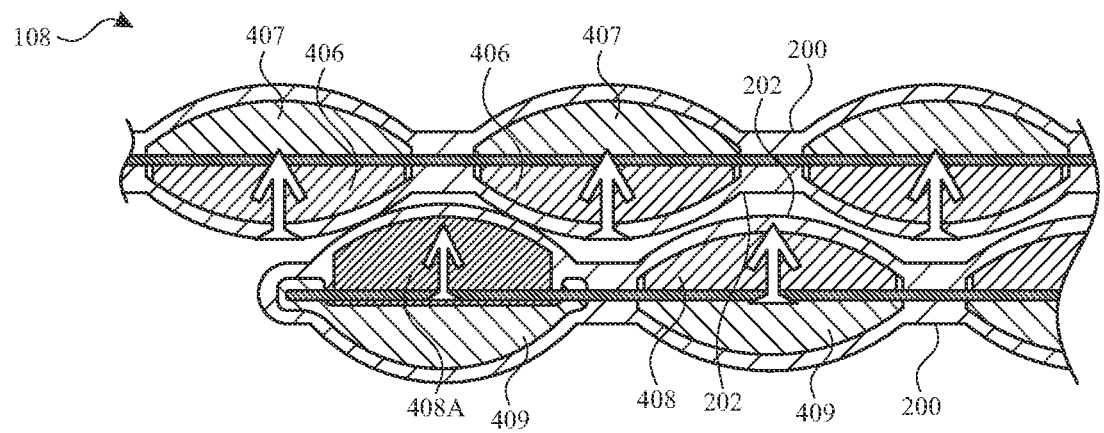
FIG. 13 shows a sectional view of overlapping portions of the wristband of FIG. 12 in a first configuration.
Figure 14:
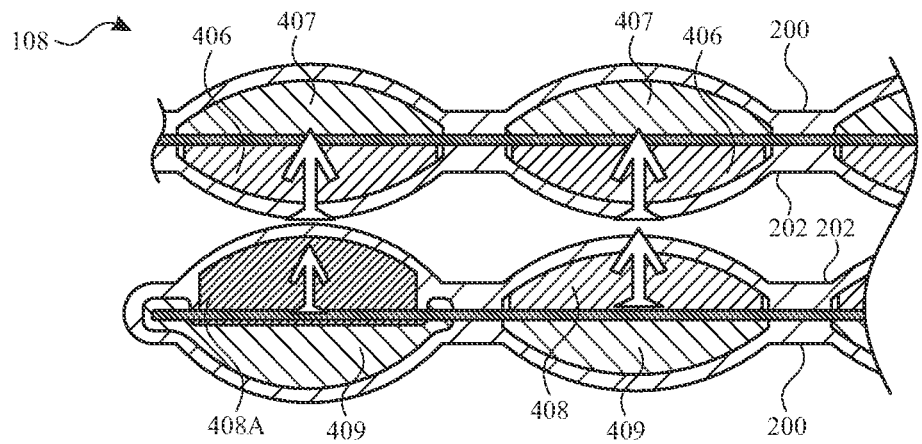
FIG. 14 shows a sectional view of overlapping portions of the wristband of FIG. 12 in a second configuration.

Referring now to FIGS. 12-14, the magnets can have different magnetic field orientations at different sections of the wristband. For example, as shown in FIG. 12, first magnets 406 along a first section 400 of the wristband 108 can have a magnetic field orientations that is different (e.g., opposite) with respect to the magnetic field orientations of second magnets 408 along a second section 402 of the wristband 108.

As shown in FIG. 13, when the wristband is folded onto itself, some of the first magnets 406 and second magnets 408 can be nested within each other while the contact surface 202 faces itself. In this arrangement, the first magnets 406 and second magnets 408 can be magnetically coupled to each other. Other regions of the same wristband 108 may be arranged as shown in FIG. 14. In this region, the first magnets 406 and second magnets 408 can also be magnetically coupled to each other.

Figure 15:
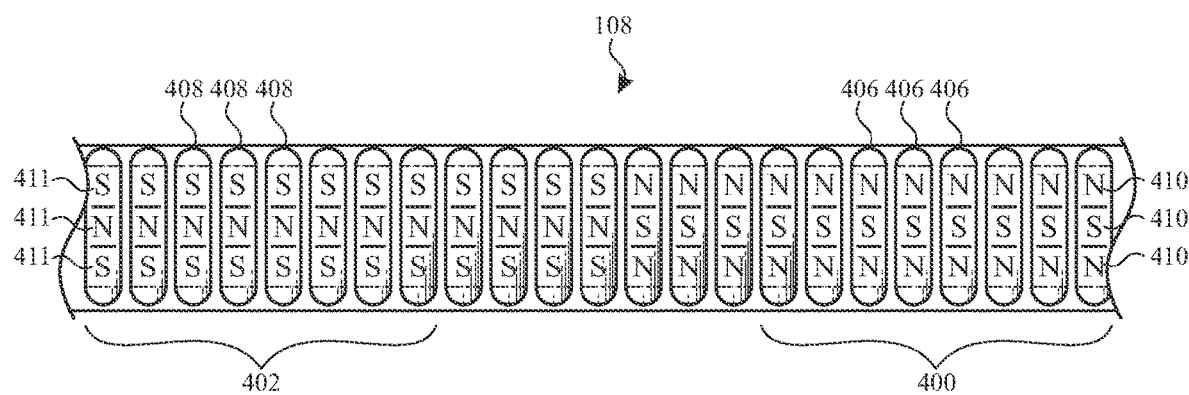
FIG. 15 shows a schematic diagram for a wristband.

Referring to FIG. 15, the magnets can include a multi-pole magnet structure that includes two or more individual magnets. For example, as shown in FIG. 15, the first magnets 406 and/or the second magnets 408 can be arranged to vary the polarity pattern of individual magnetic components 410 and 411. As shown in FIG. 15, the polarity pattern can be an alternating polarity pattern where the north N (positive) and south S (negative) poles alternate across each multi-pole magnet structure. The magnetic fields produced by the multi-pole magnet structure can attract objects. For example, a magnetic attraction force can ensure that the individual magnetic components 410 of the first magnets 406 are magnetically coupled to distinct magnetic components 411 of the second magnets 408. Each multi-pole magnet can include, for example, 2, 3, 4, 5, 6, 7, 8, 9, or more than 9 magnetic components with different (e.g., alternating) polarity patterns. One or more continuous, non-contiguous, or discrete shunts can be positioned opposite one or more of the multi-pole magnet structures to re-direct the magnetic fields of the multi-pole magnet structure.

Figure 16:
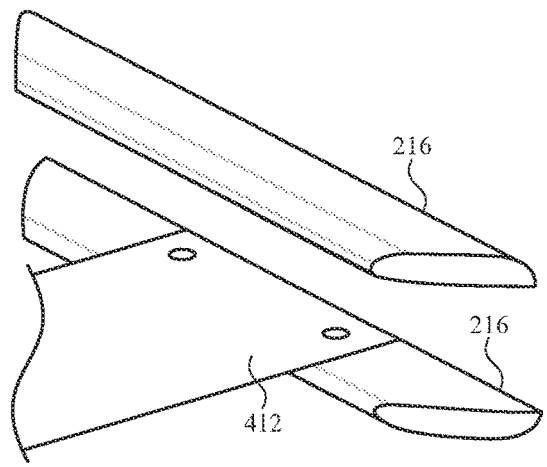
FIG. 16 shows a perspective exploded view of a connector for a wristband.
Figure 17:
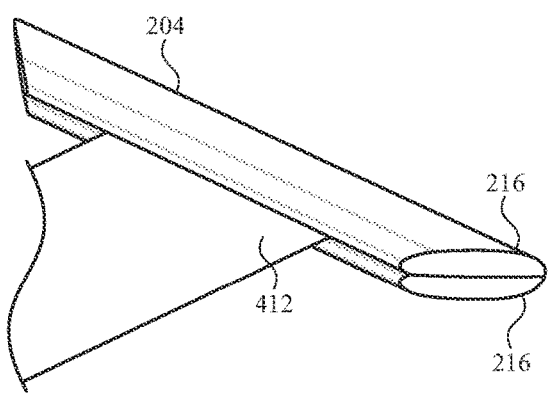
FIG. 17 shows a perspective view of the connector of FIG. 16.

Referring to FIGS. 16 and 17, the connector of a wristband can be secured to the support structure. For example, as shown in FIG. 16, separate parts 216 of the first connector 204 can be joined together with a portion of the support structure 412 extending there between. As shown in FIG. 17, the parts 216 can be secured together to that the support structure 412 is sandwiched and secured relative to the first connector 204. Additionally or alternatively, a portion of the first connector 204 can be molded over the support structure 412.

Figure 18:
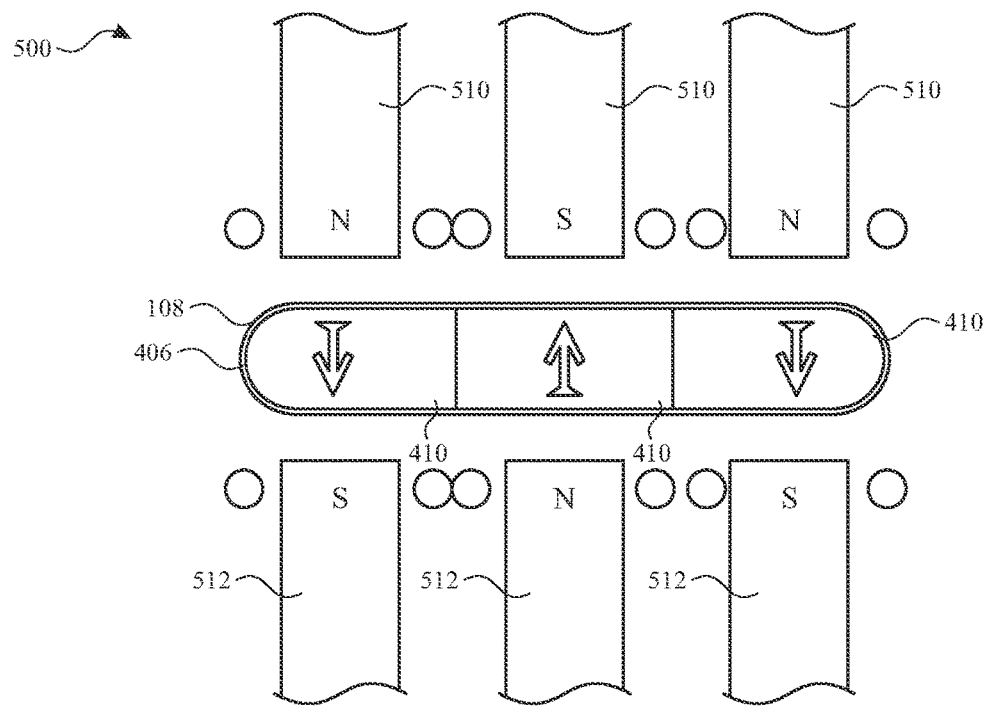
FIG. 18 shows a schematic view of a system for magnetizing a wristband.

Referring to FIG. 18, a polarity pattern of individual magnetic components can be established with the application of a magnetic field. A magnetization system 500 can be used to apply a magnetic field across distinct portions of a wristband 108. For example, one or more first magnetization components 510 can be placed on a first side of a magnet 406, and one or more second magnetization components 512 can be placed on a second side of the magnet 406. Each first magnetization component 510 can be placed opposite a second magnetization component 512 that has an opposite magnetic polarity to create a magnetic field that is oriented through the magnet 406. Different pairs of first magnetization components 510 and second magnetization components 512 can have different magnetic polarity arrangements, such that the individual magnetic components 410 of the magnet 406 have different magnetic polarity alignments. For example, as shown in FIG. 18, the magnetic polarity alternates for adjacent pairs of first magnetization components 510 and second magnetization components 512, as well as for adjacent pairs of individual magnetic components 410 of the magnet 406. Accordingly, the magnetic field orientation for each individual magnetic component 410 is generally uniform within the magnet 406. Different magnetic components 410 can have magnetic field orientations that are parallel, including in opposite directions.

Figure 19:
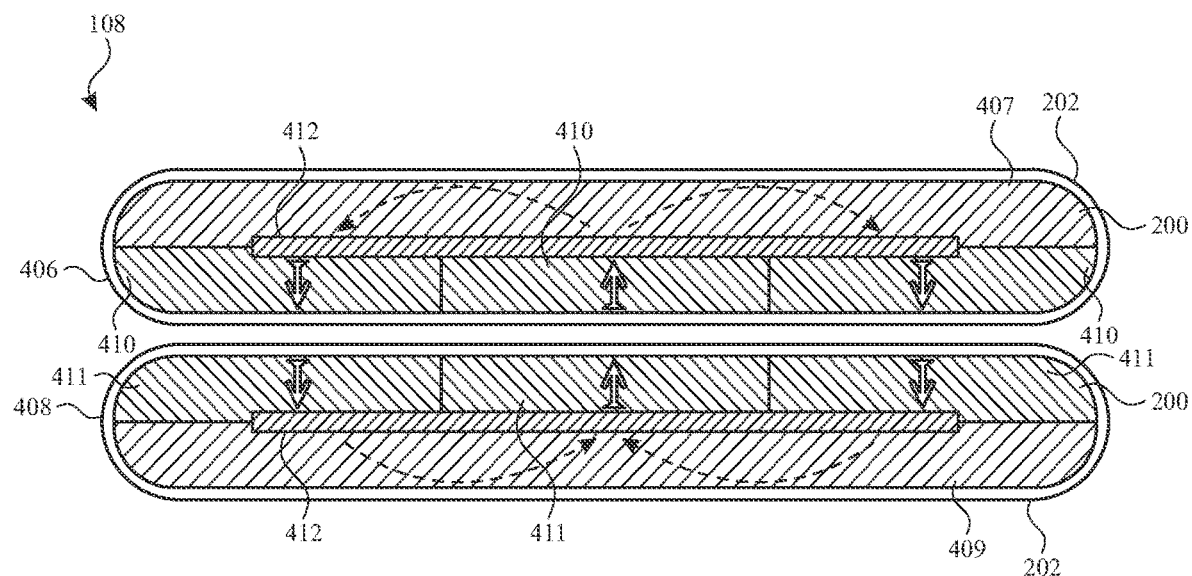
FIG. 19 shows a sectional view of an example of overlapping portions of the wristband of FIG. 3 taken along line A-A.

As shown in FIG. 19, the magnet 406 can be part of a wristband 108 that is configured to have overlapping portions. At engagement surfaces 200 of the overlapping portions, the inner first magnets 406 and the inner second magnets 408 can face each other for magnetic coupling. Magnetic fields of the magnetic components 410 and magnetic components 411 can be arranged so that the inner first magnets 406 and the inner second magnets 408 are magnetically attracted to each other. At contact surfaces 202 of the overlapping portions, the outer first magnets 407 and the outer second magnets 409 can act as shunts so that, when the wristband is folded onto itself, the shunts face outwardly and the inner first magnets 406 and the inner second magnets 408 face each other for magnetic coupling. The shunts can substantially block, redirect, or minimize a magnetic flux in a region covered by the shunt. This reduces magnetic flux outside the wristband 108. Optionally, the support structure 412 can be provided between opposing pairs of magnets.

Figure 20:
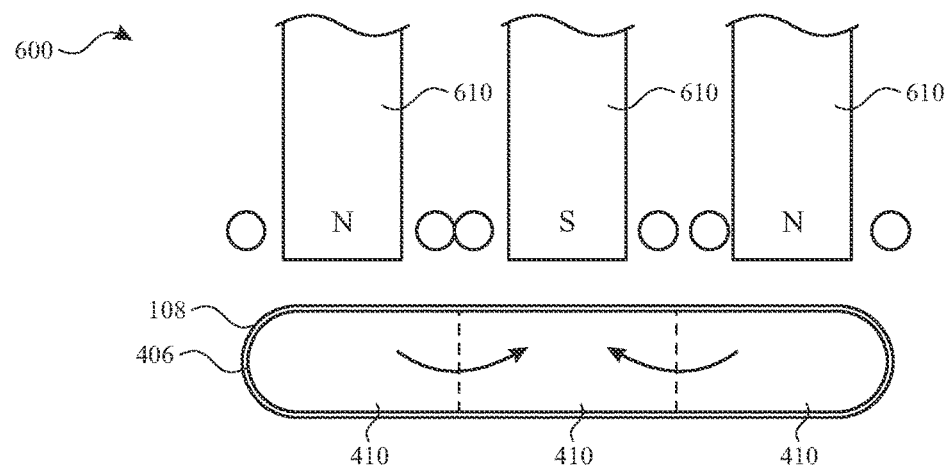
FIG. 20 shows a schematic view of a system for magnetizing a wristband.

Referring to FIG. 20, a polarity pattern of individual magnetic components can be established with the application of a magnetic field from a single side of the wristband. A magnetization system 600 can be used to apply a magnetic field across distinct portions of a wristband 108. For example, one or more magnetization components 610 can be placed on a first side of a magnet 406. As shown in FIG. 20, the magnetic polarity alternates for adjacent pairs of magnetization components 610. In the absence of additional magnetization components opposite the magnetization components 610, the magnetic fields extend between adjacent pairs of magnetization components 610, which have opposite magnetic polarities. Accordingly, the resulting magnetic field extends through the magnet 406 along an arcing or curved path. For example, the orientation is different across different portions of each magnetic component 410 within the magnet 406. This magnetic field orientation is maintained in the magnet 406 by contributions of individual particles of the magnetic material (e.g., powder). Each of the particles is oriented within the polymer according to the applied magnetic field from the system 600. Where the particles are anisotropic, the particles align with the applied magnetic field according to their preferred magnetization direction. After alignment, the particles maintain a permanent magnetic field.

Figure 21:
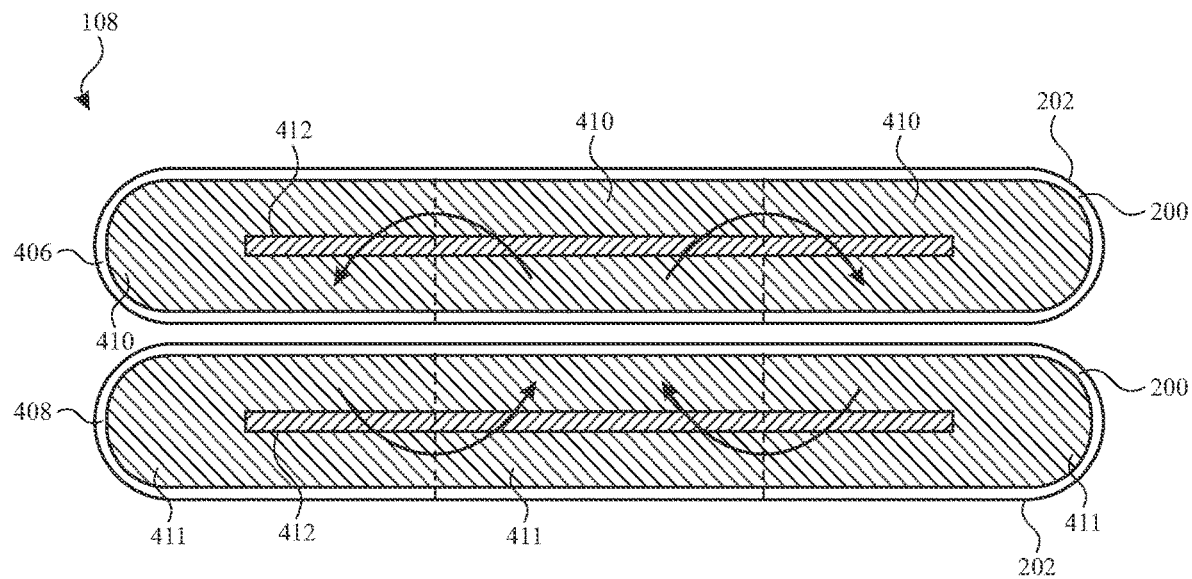
FIG. 21 shows a sectional view of another example of overlapping portions of the wristband of FIG. 3 along line A-A.

Referring to FIG. 21, an arcing or curved magnetic field within the magnet can provide high magnetic flux on engagement surfaces of the wristband and a low magnetic flux on contact surfaces of the wristband. As shown in FIG. 21, the magnet 406 can be part of a wristband 108 that is configured to have overlapping portions. At engagement surfaces 200 of the overlapping portions, the first magnet 406 and the second magnet 408 can face each other for magnetic coupling. Magnetic flux through the engagement surfaces 200 can be high with distinct polarities at different portions of the engagement surfaces 200 (e.g., at different regions forming the magnetic components 410 and magnetic components 411). The magnetic field orientations are arranged so that the first magnets 406 and the inner second magnets 408 are magnetically attracted to each other. Magnetic flux is lower through the contact surfaces 202 so that, when the wristband is folded onto itself, the contact surfaces 202 face outwardly and residual magnetic flux is reduced even without a separate magnetic shunt. Optionally, the support structure 412 can be provided within the magnets.

Figure 22:
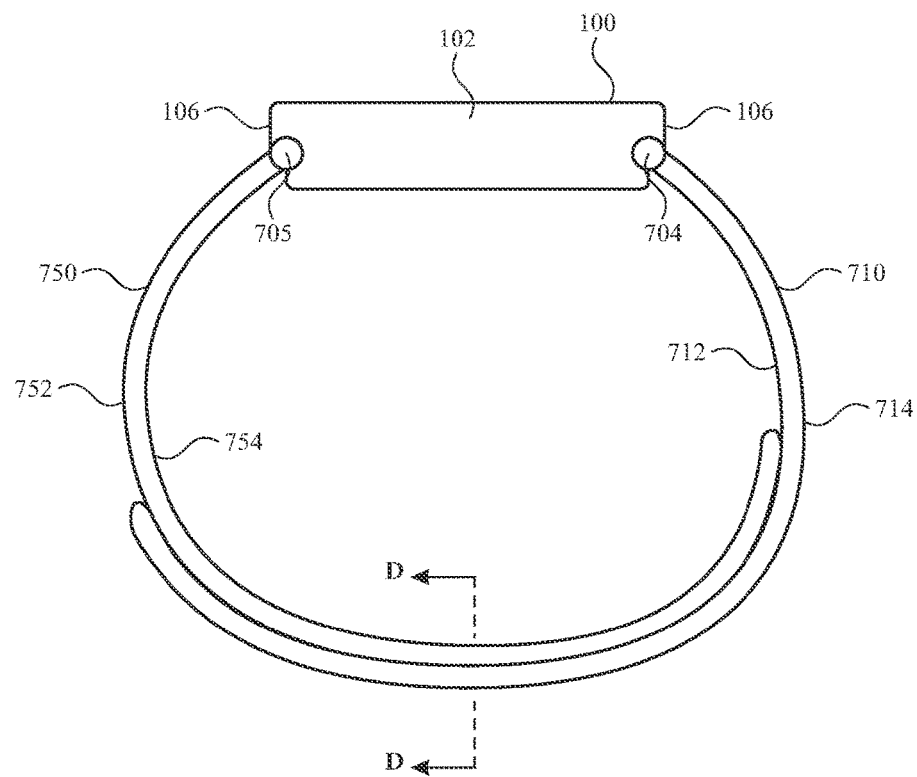
FIG. 22 shows a side view of a watch with a wristband.

Referring now to FIG. 22, a wristband can include separate band portions to facilitate adjustability with magnetic coupling. The wristband 700 is adjustable to fit securely and comfortably onto a wrist by selecting an extent of overlap between the first band portion 710 and the second band portion 750. For example, the diameter of the wristband 700 is adjustable to be appropriate for a secure and comfortable fit on the wrist. Each of the first band portion 710 and the second band portion 750 removably attaches to a portion (e.g., a channel 106) of the housing 102 of the electronic device 100 with a first connector 704 or a second connector 705, respectively. Accordingly, the wristband 700 is removable from the electronic device 100, thereby permitting a user to switch wristbands as necessary or desired.

A contact surface 714 of the first band portion 710 is positionable as an outwardly facing surface. An engagement surface 712 of the first band portion 710 is positionable as an inwardly facing surface to engage the second band portion 750 when the band portions overlap. An engagement surface 752 of the second band portion 750 is positionable as an outwardly facing surface to engage the first band portion 710 when the band portions overlap. Magnets are provided near at least the engagement surface 712 and the engagement surface 752 to magnetically couple the first band portion 710 to the second band portion 750, as described further herein. A contact surface 754 of the second band portion 750 is positionable as an inwardly facing surface to contact the wrist of the user.

While the wristband 700 of FIG. 22 extends from opposite sides of the housing 102 of the electronic device 100, rather than extending from one side and overlapping itself as in the wristband 108 of FIG. 3, it will be recognized that various features of the wristband 700 can be similar to the wristband 108, as described herein. In particular, the overlapping portions of the first band portion 710 and the second band portion 750 can be similar in one or more aspects to the overlapping portions of the wristband 108. As such, the first band portion 710 and the second band portion 750 of the wristband 700 can be similar to the overlapping portions of the wristband 108 as illustrated in FIGS. 10, 11, 13, 14, 19, and 21. It will be understood that the first band portion 710 of the wristband 700 can include magnets similar to inner first magnets 406 and/or outer first magnets 407, and that the second band portion 750 of the wristband 700 can include magnets similar to inner second magnets 408 and/or outer second magnets 409. As such, the features described herein relating to the overlapping portions of the wristband 108 will be understood to optionally apply to the first band portion 710 and the second band portion 750 of the wristband 700.

Figure 23:
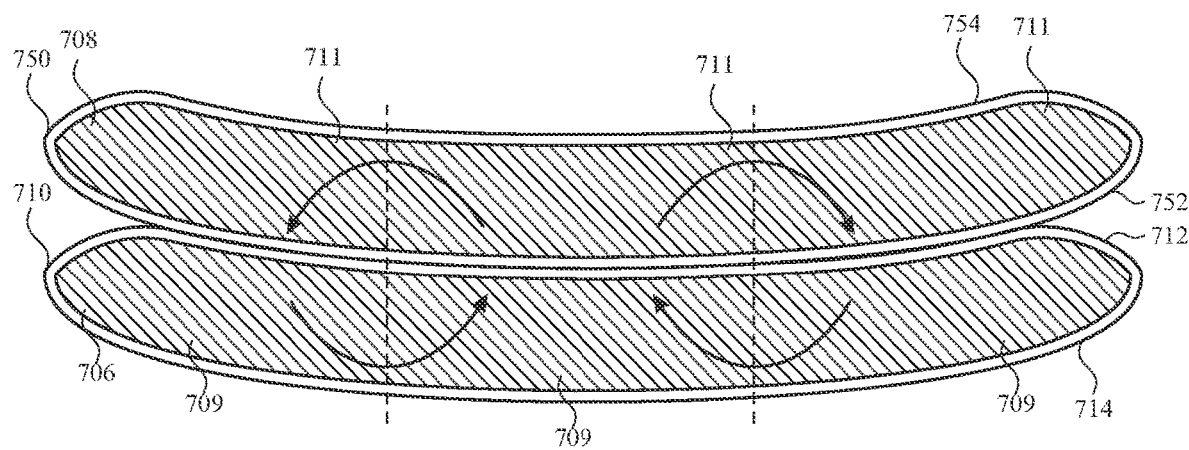
FIG. 23 shows a sectional view of an example of overlapping portions of the wristband of FIG. 22 along line D-D.

Additionally or alternatively, the wristband can include features that facilitate coupling and securement of the separate band portions extending from opposite sides of the watch housing. For example, the first band portion 710 and the second band portion 750 of the wristband 700 can have a geometry that facilitates coupling and provides comfort for the user. As shown in FIG. 23, each of the first band portion 710 and the second band portion 750 can have complementary shapes that allow one band portion to at least partially nest within another.

The first band portion 710 can include a concave engagement surface 712 and/or a convex contact surface 714. The second band portion 750 can include a convex engagement surface 752 and/or a concave contact surface 754. The engagement surfaces 712 and 752 can provide a wide area of engagement during magnetic coupling. The concave contact surface 754 can conform readily to a wrist of the user, and the convex contact surface 714 can provide a smooth outwardly facing side of the wristband 700.

As shown in FIG. 23, a first magnet 706 of the first band portion 710 and a second magnet 708 of the second band portion 750 can have magnetic polarity arrangements that facilitate magnetic coupling. For example, the first magnet 706 can include individual magnetic components 709 with different magnetic alignments to couple to individual magnetic components 711 of the second magnet 708. As shown in FIG. 23, the magnetic field orientations can curve within the magnets 706 and 708. Additionally or alternatively, the magnetic field orientations can be similar to those described herein in relation to the wristband 108.

Figure 24:
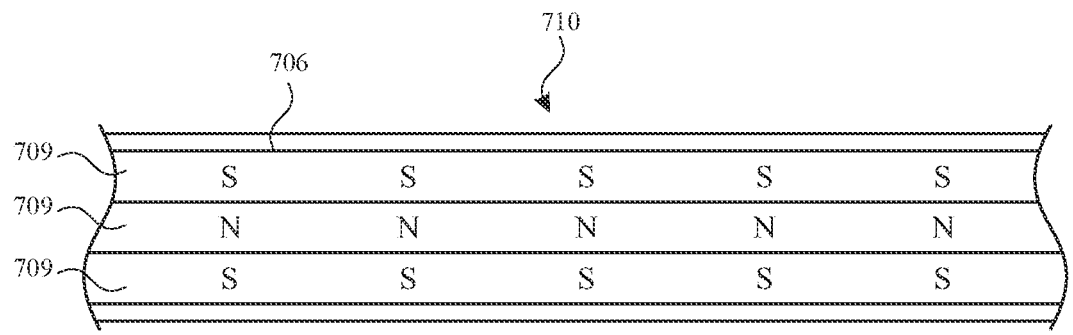
FIG. 24 shows a schematic diagram for a wristband.

Referring now to FIG. 24, a magnet of a given band portion can have magnetic components, each with a magnetic field orientation that is consistent along a longitudinal length of the given band portion. For example, an individual magnetic component 709 of a magnet 708 can extend along at least a portion of the longitudinal length of the first band portion 710. Along that length, each individual magnetic component 709 can maintain the same magnetic polarity. Because neither the first band portion 710 nor the second band portion 750 is required to fold onto itself to secure a watch to a user, the magnets in each need not alternate or change polarity along a length thereof. By providing a consistent polarity along the length of each, the first band portion 710 and the second band portion 750 can be magnetically coupled to each other with any one of a variety of degrees of overlap. Thus, small adjustments are possible to allow the user to finely adjust the tightness of the wristband 700. In contrast, the folding wristband 108 described above can have an alternating or otherwise different polarity pattern along its length to allow the overlapping portions to magnetically attract each other, rather than repel each other. As shown in FIG. 24, the magnetic polarities across magnetic components 709 can alternate along the width of the band portion 710. The alternating polarities along the width provide the band portions to magnetically couple with their widths aligned, so that edges of both band portions are aligned (as further shown in FIG. 23).

Figure 25:
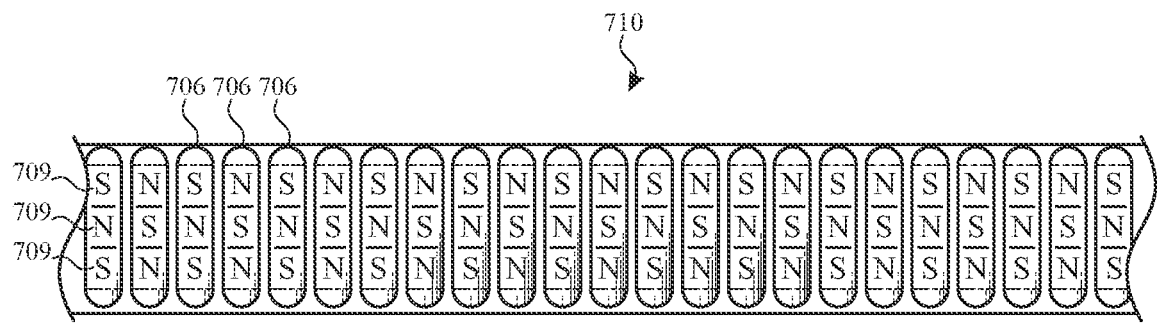
FIG. 25 shows a schematic diagram for a wristband.

Referring now to FIG. 25, magnets of a given band portion can have magnetic components with alternating polarities along a longitudinal length of the given band portion. As shown, the magnetic polarities across magnetic components 709 and across magnets 706 can alternate along the length and/or the width of the band portion 710. The alternating polarities along the length provide the band portions to magnetically couple at discrete locations, rather than continuously along different degrees of overlap.

Figure 26:
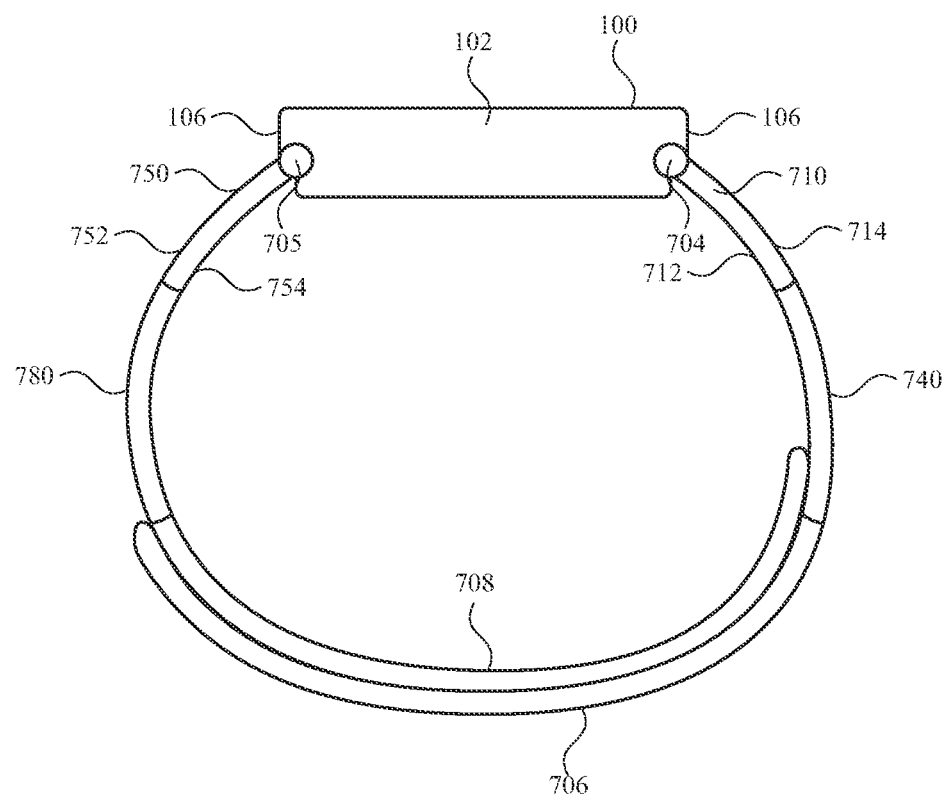
FIG. 26 shows a side view of a watch with a wristband.

Referring now to FIG. 26, a wristband can include portions with soft magnetic material to manage magnetic flux outside of the wristband. While the first band portion 710 overlaps the second band portion 750, at least one of the first magnets 706 is overlapping at least one of the second magnets 708. As discussed herein, the amount of overlap can be adjusted to change a tightness of the wristband 700 on a wrist of the user. As such, the amount of overlap can be different for different users and at different times. Accordingly, non-overlapping portions can be exposed to different degrees and emitting magnetic flux outside of the wristband. This can be detrimental effects on magnetically sensitive items that are in the vicinity of the wristband. Because hard magnetic materials emit residual magnetic flux, it can be beneficial to reduce the amount of hard magnetic materials in portions that are or could be non-overlapping.

As shown in FIG. 26, the first band portion 710 can include a first soft magnetic portion 740 between the first magnets 706 and the first connector 704. The second band portion 750 can include a second soft magnetic portion 780 between the second magnets 708 and the second connector 705. When the first soft magnetic portion 740 overlaps with the second magnets 708, they can be magnetically coupled to each other. Similarly, when the second soft magnetic portion 780 overlaps with the first magnets 706, they can be magnetically coupled to each other. However, when the first soft magnetic portion 740 and/or the second soft magnetic portion 780 does not overlap (e.g., is exposed), it does not emit residual magnetic flux because it contains a soft magnetic material that does not generate its own magnetic field. Accordingly, the first soft magnetic portion 740 and the second soft magnetic portion 780 reduces residual magnetic flux outside the wristband while facilitating magnetic coupling.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and magnets are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A wristband for securing a watch to a user, the wristband comprising:
   flexible permanent magnets, wherein each of the flexible permanent magnets comprises a mixture of a polymer and a ferromagnetic material;
   a flexible cover surrounding each of the flexible permanent magnets;
   a connector configured to connect to a watch housing; and
   a soft magnetic portion comprising a soft magnetic material and being between the flexible permanent magnets and the connector.

2. The wristband of claim 1, wherein the flexible permanent magnets comprise a first permanent magnet and a second permanent magnet, and the wristband further comprises:
- a first band portion configured to attach to a first side of the watch housing, the first band portion containing the first permanent magnet; and
- a second band portion configured to attach to a second side of the watch housing, the second band portion containing the second permanent magnet.

3. The wristband of claim 2, wherein:
the connector is a first connector of the first band portion;
the soft magnetic portion is a first soft magnetic portion of the first band portion; and
the second band portion comprises:
- a second connector for attaching to the second side of the watch housing; and
- a second soft magnetic portion between the second permanent magnet and the second connector.

4. The wristband of claim 1, further comprising a sintered permanent magnet at a free end of the wristband, opposite the connector.

5. The wristband of claim 4, wherein the ferromagnetic material of the flexible permanent magnets is a hard magnetic material.

6. The wristband of claim 1, wherein the flexible permanent magnets are positioned as opposing pairs distributed along a length of the wristband, wherein the opposing pairs are cross-linked to each other.

7. The wristband of claim 1, further comprising a free end opposite the connector, wherein the flexible cover extends continuously from the connector to the free end.

8. A wristband for securing a watch to a user, the wristband comprising:
flexible magnets, wherein each of the flexible magnets comprises a mixture of a polymer and a ferromagnetic material, wherein each of the flexible magnets comprises:
- permanent magnets; and
- magnetic shunts positioned opposite a corresponding one of the permanent magnets, wherein a magnetic flux on a side of the wristband that is adjacent to the magnetic shunts is lower than a magnetic flux on a side of the wristband that is adjacent the permanent magnets; and
a flexible cover surrounding each of the flexible magnets.

9. The wristband of claim 8, wherein the ferromagnetic material of the permanent magnets comprises anisotropic particles, and the ferromagnetic material of the magnetic shunts comprises isotropic particles of a soft magnetic material.

10. The wristband of claim 8, wherein the ferromagnetic material of the magnetic shunts is a soft magnetic material.

11. The wristband of claim 8, further comprising:
a connector configured to connect to a watch housing; and
a free end opposite the connector, wherein the flexible cover extends continuously from the connector to the free end.

12. The wristband of claim 11, further comprising a sintered permanent magnet at the free end of the wristband.

13. The wristband of claim 8, wherein each of the permanent magnets is cross-linked to an opposing one of the magnetic shunts.

14. A wristband for securing a watch to a user, the wristband comprising:
multiple opposing pairs of magnets;
a support structure extending between each of the opposing pairs of the magnets, wherein the opposing pairs of magnets comprise first magnets on a first side of the support structure and second magnets on a second side of the support structure;
a cover surrounding the magnets; and
a connector configured to connect the wristband to a watch housing, the connector comprising a first part on the first side of the support structure and a second part on the second side of the support structure, the first part and the second part being joined together with a portion of the support structure secured between the first part and the second part.

15. The wristband of claim 14, wherein the magnets are flexible magnets each comprising a mixture of a polymer and particles of a hard magnetic material, and each opposing pair of the magnets are connected to each other through the support structure and outside a width of the support structure, and two of the magnets are configured to magnetically couple to each other when the wristband is folded onto itself.

16. The wristband of claim 14, wherein the support structure comprises woven fibers.

17. The wristband of claim 14, wherein the support structure comprises holes, wherein each of the holes is positioned between a corresponding pair of the magnets.

18. The wristband of claim 14, wherein widths of the magnets are greater than a width of the support structure, such that the opposing pairs of the magnets are connected to each other outside the width of the support structure.

19. The wristband of claim 14, further comprising a free end opposite the connector, wherein the support structure extends continuously from the connector to the free end.

* * * * *